Patented Aug. 11, 1942

2,292,507

UNITED STATES PATENT OFFICE 2,292,507

MANUFACTURE OF TITANIUM DIOXIDE

Maxwell J. Brooks, New York, N. Y., assignor to General Chemical Company, New York, N. Y., a corporation of New York No Drawing. Application March 29, 1940, Serial No. 326,675

6 Claims. (Cl. 23—202)

This invention is directed to improvements in methods for accelerating hydrolysis of titanium sulfate solutions.

The bulk of commercial $TiO_2$ pigments is produced by hydrolysis (effected by boiling) of concentrated basic titanium sulfate solutions made by digesting ilmenite with sulfuric acid. In addition to known hydrolysis control conditions with respect to $TiO_2$, iron and acid concentrations, and more or less freedom from soluble and insoluble impurities, the commercial art has found it desirable to "seed" the titanium sulfate solution to be hydrolyzed. Without so-called seeding before or during the early stages of boiling, hydrolysis rates and yields of $TiO_2$ are generally low, and calcined final products are usually of poor pigment grade. In the literature and in commercial practice methods for seeding to overcome these defects have been such as to fall within one of several general groups.

In processes of one group, separately prepared ortho-titanic acid is added to the solution to be hydrolyzed. The orthotitanic acid used is made by neutralizing a titanium sulfate solution with suitable alkali in such a way as to form a solid orthotitanic acid gel-like mass, or a solid orthotitanic acid precipitate which is separated from liquid reaction products, the gel or the separated orthotitanic acid precipitate being used as seeding agent for addition to the titanium sulfate solution to be hydrolyzed. Orthotitanic acid made in this way adsorbs substantial quantities of iron initially present in the original titanium sulfate solution treated with the alkali. The condition of this adsorbed iron is such that the iron content goes through the hydrolysis operation and contaminates the final product. Further, orthotitanic acid seeding material of this type tenaciously holds sulfates of the alkali metal used in the neutralizing step, with the result that while such sulfates do not in a material way adversely affect hydrolysis per se, the presence of these sulfates in the hydrolysis operation mother liquor presents substantial problems in eliminating such sulfates in other process stages in which the mother liquor is treated for the recovery of sulfuric acid to be reused in a subsequent cycle. Chiefly, for these reasons seeding methods involving use of separately prepared orthotitanic acid have not become of any commercial importance.

In processes representative of a second group, seeding is brought about by treating the titanium sulfate solution to be hydrolyzed with a colloidal solution of titanium oxide. While seeding in this manner is effective, such procedure involves two substantial operating objections. The first is the difficulty encountered in preparing two successive colloidal seeding solutions having the same seeding properties. The disadvantages of conducting a plant operation with non-uniform seeding solutions are evident. The second objection is that colloidal seeding solutions can be prepared only a very short time in advance of actual use because of the continual change of chemical and physical properties of a colloidal solution of titanium oxide.

A third general prior method for seeding consists in addition to the solution to be hydrolyzed of a seeding mass comprising solid precipitated orthotitanic acid in suspension in a more or less colloidal titanium oxide solution. Such a mass is made by partially neutralizing a titanium sulfate solution with a suitable alkali. In this method for making a seed suspension conditions favor contamination of the precipitated orthotitanic acid with iron. Broadly considered, such a seeding agent is a combination of the seeding materials of the first two classifications mentioned above. Consequently, this third general method involves all of the objections inherent in methods of the first two groups. Prior art seeding procedures of a fourth group involve so-called formation of orthotitanic acid in situ in the solution to be seeded. Such methods are objectionable principally because it is not possible to effect consistently uniform seeding of successive batches of solutions to be hydrolyzed. Practice of this method requires very careful addition of a small amount of a neutralizing base to the main solution to insure only local neutralization which is the principle relied upon to effect seeding. Consequently, successful seeding depends almost wholly upon the personal skill of the operator. Practice of another prior art seeding method involves heating the solution to be hydrolyzed to a definite temperature and adding the hot solution at a given rate to a given volume of boiling water. Seeding is effective but the operation requires very close control. In carrying out the hydrolysis proper, concentrations of $TiO_2$, iron, and acid are regulated to within relatively narrow limits, and temperature of both the solution to be hydrolyzed and of the water to which the solution is added, and rate of addition of the hot titanium sulfate solution to the boiling water are all critical.

The principal object of this invention is provision of methods for seeding commercial hydrolyzable titanium salt solutions to accelerate hydrolysis thereof by procedures which do not involve objectionable features, such as noted above.

Briefly, the method of the present invention comprises treating a crystalloidal relatively high acid factor titanium sulfate solution (herein for convenience termed "main solution") to be hydrolyzed with a small amount of a solid titanium-oxygen-sulfate compound having relatively low acid factor, and then effecting hydrolysis of the resulting mass by heating.

With respect to the term "acidity factor," it is noted that as known in the art relating to production and use of titanium sulfate solutions and solid compounds percent "acidity factor" or "factor of acidity," represented by F. A., of a titanium sulfate solution or solid compound is the ratio, multiplied by 100, of the so-called free $H_2SO_4$, (i. e., acid not combined with bases or with titanium as $TiOSO_4$) and the titanium equivalent acid based on $TiOSO_4$, (i. e. the acid constituent of $TiOSO_4$ as such). Free acid plus acid combined with titanium to form $TiOSO_4$ as such is designated "active acid." In terminology of the art, zero F. A. represents a condition in which all titanium is present as titanyl sulfate ($TiOSO_4$), and 100% F. A. represents a condition in which all titanium is present as tetravalent titanium disulfate, $Ti(SO_4)_2$. Titanium sulfate solution or solid compound containing less acid than needed to combine with bases other than titanium and to form $TiOSO_4$ with the titanium present is designated as having a minus acidity factor. For example, in a case where solution conditions are such that substantially all of the titanium has been precipitated out as hydrate, e. g. as a result of neutralization of all of the acid, F. A. of the mother liquor is about minus 100%.

Low acidity factor solid titanium-oxygen-sulfate compounds, used as seeding agents in accordance with the present invention, may be made by several different methods. For illustrative purposes immediately below are given two procedures (not part of the present improvements) by which it is possible to effect production of low F. A. solid titanium-oxygen-sulfate compounds adequately suited for carrying out the hydrolysis process of the present invention. In the manufacture of such compounds, iron containing ilmenite ores or iron free titanium dioxide may be used as sources of titanium. In following Method I, raw materials of the former type are employed.

METHOD I

This procedure may be outlined as follows. Titanium ore such as ilmenite is digested under atmospheric pressure with sulfuric acid to form an initial digest cake in which titanium and iron are principally in the form of water soluble sulfates. The cake is then heated or baked at relatively high temperatures, preferably not exceeding a maximum, to convert water soluble titanium to a low F. A. titanium-oxygen-sulfate compound, e. g. titanyl sulfate, $TiOSO_4$, (zero F. A.). Baking is conducted so that titanyl sulfate is not appreciably decomposed to metatitanic acid and so that basic ferric iron associated with the titanium is not converted to a form too highly basic as to prevent subsequent reduction to ferrous. baked cake comprises chiefly low F. A. titanium-oxygen-sulfate compound, ferric sulfate, some ferrous sulfate and some water insoluble basic ferric sulfate more or less bound up with the titanium. The mass is leached with water under conditions such as to separate from the solid titanium as much water soluble ferrous and ferric sulfate as feasible, and to avoid any appreciable decomposition of titanium compound by the leaching liquor. In this way most of the associated iron is washed out and there is produced a solid easily filterable low F. A. basic titanium-oxygen-sulfate compound contaminated with a small amount of basic ferric sulfate. Such compound, after separation from the liquor by filtration, is used in the process of this invention as seeding agent.

In practice of this procedure, raw titaniferous materials preferred for digestion with sulfuric acid are those in which not less than about 70% of the total iron is in the ferric form. Some ilmenite ores fall within this classification. Titaniferous materials in which ferric iron content is low may be calcined under oxidizing conditions to raise the ferric iron percentage to the degree indicated.

To obtain most satisfactory ore decomposition and titanium yields, and further to provide in the mass a certain amount of sulfuric acid available for some oxidation of ferrous iron to ferric, it is preferred to use in the ore-acid digest an amount of sulfuric acid in excess of that theoretically required to convert titanium of the ore to the disulfate $Ti(SO_4)_2$. Generally, ore and acid are digested in proportions of about one part of ore to 2–2.5 parts by weight of $H_2SO_4$ which may be used in the form of 60 or 66° Bé. acid or stronger.

Sulfuric acid and ore, preferably finely divided say 100 to 300 mesh, are charged into an open top digestion vat. Although initial reaction of ore and acid is largely exothermic some extraneous heat may be applied to raise and maintain the mass at temperature from about 175° C. to about 200° C. During heating, which may continue for say an hour, acid reacted titanium oxide is converted to sulfate and the digest mass is in the form of a relatively soft cake having F. A. which may vary from say 75% to 150%.

The ore-acid digest mass is then subjected to further heating or baking, preferably in the digest vat, by means of extraneous heat. Baking temperatures are from not less than about 300° C. to not more than 500° C. At temperature of about 225° C. the mass begins to lose $SO_4$ radical and F. A. begins to decrease progressively as temperature rises. Baking at temperatures of around 300° C. or more may be continued for about an hour, and over a subsequent period say two hours temperatures may be increased to not more than 500° C.

Once any considerable amount of titanium-oxygen-sulfate compound, formed by the baking operation and containing iron especially as basic ferric sulfate, is converted to meta-titanic acid, associated iron changes to a form so highly basic that it cannot be readily reduced to ferrous. By regulating baking temperature as indicated decomposition of titanium sulfate to metatitanic acid is prevented and at the same time conversion of associated basic ferric sulfate to a form too basic and of a character which cannot be readily reduced is avoided. Baking should be carried on at temperatures and for a time interval preferably long enough to drive off from the mass all the so-called free sulfuric acid. End point of baking may be determined by the absence of visible fumes given off from the mass. At this stage, the mass is a dry, light-colored cake comprising solid titanium-oxygen-sulfate compound of ordinarily about zero F. A., possibly some water soluble ferrous sulfate, a substantial amount of water soluble ferric sulfate, and some water insoluble basic ferric sulfate more or less firmly bound up with the titanium compound as a complex salt.

The baked cake is subjected to water leaching under conditions to remove from the mass water soluble iron as ferrous and ferric sulfate; to minimize dissolving of titanium in the leach liquor; and to prevent conversion of low F. A. titanium sulfate to metatitanic acid with attendant change of complexly-held basic iron sulfate to a more difficultly reducible form. For this purpose the cake is leached by agitating preferably with an amount of water for example 1 to 1.2 parts of water by weight per part of the cake at about temperatures preferably about 60–70° C. and not in excess of 80° C. There is thus obtained a neutral or slightly basic liquor containing for example 85% or more of the total iron of the ore as ferric sulfate and also variable amounts of titanium sulfate. The bulk of the titanium remains in solid condition as a white flocculent and easily filterable low F. A. solid titanium-oxygen-sulfate compound containing a small amount of complexly-held basic iron sulfate. During water leaching a small but appreciable amount of titanium sulfate is hydrolyzed to more basic titanium compounds, releasing sulfate radical into the leach liquor, and increasing in the residual solid material the proportion of $TiO_2$ to $SO_4$. This results in a lowering of F. A. of the solid material. In the case of baked cake of about zero F. A., water leaching may further lower F. A. to say from minus 5 to minus 25 or 30%.

The following is a specific illustration of preparation from iron containing ilmenite:

*Example 1.*—Ilmenite ore comprising 52.8% $TiO_2$, 7.1% $FeO$, 28.5% $Fe_2O_3$ (78.4% of the total iron being in the ferric state) was digested at atmospheric pressure with 60° Bé. $H_2SO_4$ in amount equivalent to 118% of that required to convert the titanium oxides of the ore to titanium disulfate. The slurry was heated at 175–200° C. for about an hour and there was obtained a soft, brown colored cake. Temperature was then raised to 275–300° C. for about an hour, raised to about 400° C. for another hour, and then finally to 500° C. for another hour, driving off excess $H_2SO_4$. The cooled cake was a dry, light gray sandy mass. On leaching with 1 to 1.2 parts of water per part of cake at temperatures ranging from about 70° to not more than 80° C. a nearly neutral or slightly basic liquor containing about 88% of the total iron of the ore as ferrous and ferric sulfate, and about 17% of total titanium content of the ore as titanium sulfate was obtained. The titanium-oxygen-sulfate compound was a white, easily filterable material and after separation from the liquor comprised about 45% $TiO_2$, 0.6% $FeO$, 3.5% $Fe_2O_3$ and 48.1% $SO_3$. Yield of titanium was about 83% of the total content of the original ore, and F. A. of the filtered compound was about minus 6.3%.

Following Method 2 exemplifies production of seeding compound of the invention by procedure in which ferric iron containing ilmenite is digested with sulfuric acid under pressure:

METHOD 2

In this procedure, raw titaniferous materials used are preferably titanium ores such as ilmenite containing substantial amounts of iron in ferric state. In ores of this type, of the total iron, as little as say 25% and as much as 80% may be in the ferric condition. This procedure is carried out so that the reaction product of the sulfuric acid-ore digestion operation is a relatively water insoluble solid low F. A. titanium-oxygen-sulfate compound. To secure compounds of this kind, the initial titaniferous material used should contain a substantial amount of iron in the ferric state. The titaniferous material digested with sulfuric acid should contain as much iron in the ferric condition as is present in run-of-mine ilmenite which is usually not lower than about 15% $Fe_2O_3$.

Sulfuric acid employed should be of concentration not appreciably less than 60° Bé. Quantity of sulfuric acid used may be less than, equivalent to, or in excess of the amount theoretically required to convert titanium of the ilmenite to the disulfate, $Ti(SO_4)_2$. Preferably amount of acid used is at least equivalent to that theoretically needed for formation of titanium disulfate, although acid may be employed in amount up to say 120% of the theoretical requirements.

Ilmenite ore, preferably finely divided say to 100 to 300 mesh, and the sulfuric acid are charged into a suitable pressure digester such as an autoclave constructed so that the material therein may be heated at controlled temperatures. The mass is then heated or digested at temperatures not less than about 180° C. and not in excess of about 220° C. under the pressure generated by such heating. By digesting titaniferous materials of the type described with sulfuric acid of the concentration and in the proportions and at temperatures mentioned in a closed vessel under the pressure generated by such heating, titanium of the ore may be converted to a solid, relatively water insoluble, low F. A. titanium-oxygen-sulfate compound, e. g. titanyl sulfate, F. A. of which is zero. During pressure digestion operation, titanium of the ore is probably first converted to the normal titanium sulfate $Ti(SO_4)_2$ which is subsequently converted to the lower F. A. titanium sulfate by splitting off of $SO_3$. Practically all of whatever basic ferric sulfate may be associated with the compound is in a form amenable to reduction to ferrous state. By avoiding temperatures above 220° C. and the accompanying pressure conditions, decomposition of the low F. A. compound to metatitanic acid is prevented and conversion of associated basic ferric sulfate to a form too basic for reduction to ferrous is avoided.

End point of the heating operation may be determined by analysis of a sample of the mass to determine whether the desired condition of low F. A. has been attained. Duration of digestion at the temperature and pressure conditions indicated may be from two to four hours. A few test runs will indicate to the operator the time needed to complete the reactions under the particular conditions involved. At the end of heating the mass is ordinarily slightly mushy, and comprises in addition to the water insoluble low F. A. titanium-oxygen-sulfate compound, some sulfuric acid, some water soluble ferrous sulfate, a substantial amount of water soluble ferric sulfate, and some basic ferric sulfate more or less firmly bound up with the titanium sulfate compound as a complex salt. The pressure digested mass is then water leached and filtered as described above in Method 1 to separate the solid low F. A. basic titanium compound from water soluble iron sulfates. In general characteristics of the product are the same as those of the product of Method 1.

The following are specific illustrations of preparation of a seeding compound in accordance with procedure of the pressure digestion method described:

*Example 2.*—Ilmenite, 60% of the total iron content present as $Fe_2O_3$, was mixed in an autoclave with 66° Bé. $H_2SO_4$ in quantity theoretically required to convert titanium oxide of the ore to the disulfate. The mass was digested for about 5 hours at temperature of about 180° C. Indicated pressure of about 140 lbs. was developed. The cake was leached at 70–80° C. with about 1.5 parts of water per part of cake. The leach liquor contained about 7.4% of the titanium of the ore, and about 69.3% of the iron of the ore. About 81.7% of the iron of the liquor was ferric sulfate. The leached and washed titanyl sulfate contained about 8.4% $Fe_2O_3$, 44.3% $TiO_2$ and 47.1% $SO_3$. Yield was about 92.6% of the titanium of the ore, and F. A. of the leached product was about minus 22.5%.

By procedures similar to those described other low F. A. titanium-oxygen-sulfate compounds may be made. Compounds having F. A. higher than indicated may be produced as by shortening the baking time in Method 1 or the pressure digestion time in Method 2. Similar but iron-free seeding agents may be made by digesting pure $TiO_2$ with sulfuric acid and baking the digest product as in Method 1. By decreasing or increasing baking time, water leached products may be made having acidity factors ranging from plus 5–10% down to minus 20–30%.

I have found that low acidity factor titanium-oxygen-sulfate compounds of the type described possess physical and chemical properties the nature of which constitute such compounds suitable for use as seeding agents in hydrolysis operations. While some of these compounds may contain substantial quantities of iron (e. g., those made from ilmenite ore), such iron content is in a form which may be readily reduced to ferrous state, particularly at the temperatures of hydrolysis. Hence such iron does not adversely affect the purity of the final $TiO_2$ hydrolysis product. The seeding compounds of the present process are stable solids, and physical and chemical properties do not change. This feature affords the operating advantages that the compounds may be made in large quantities and stored for long periods before use. Thus, it is not necessary to prepare the seeding solution in small amounts and use the same while fresh. The seeding compounds of the invention may be economically produced. Their characteristics are such that the hydrolysis procedure may be readily controlled, and the hydrolyzed product has superior pigment properties.

I have found that the low F. A. solid titanium-oxygen compounds of the kind described are heat sensitive, especially under the conditions of relatively high acidity factor existing in commercially hydrolyzable titanium sulfate solutions, and are readily changed to an oxide form which effectively seeds the usual ferrous sulfate-titanium sulfate solutions used in practice. Further, I have discovered that, in the case of those seeding compounds containing iron, such iron though in the form of complexly-held water insoluble ferric sulfate is in a condition readily reducible, at the temperatures of hydrolysis, to ferrous iron provided there is maintained in the mass undergoing hydrolysis an adequate amount of reducing agent such as titanous sulfate. The amount of reducing agent needed for this purpose is about that theoretically required to reduce ferric iron of the seeding agent to ferrous. I have also observed that the described seeding properties of the seeding agents of the invention prevail whether a small amount of low F. A. compound is added to the main solution while around room temperature and the composite solution subsequently agitated and brought to boiling, or whether a small amount of the compound is incorporated with the main solution while the latter is at the boiling temperature.

In carrying out the process of the invention, the main solutions which may be hydrolyzed are, in a general sense, the crystalloidal relatively high F. A. titanium salt solutions, e. g., titanium sulfate, known in the art. Such solutions may be prepared in customary manner by digesting ground ilmenite with sulfuric acid, clarifying and concentrating the liquor, and removing part of the ferrous sulfate by cooling and crystallization.

Initial acidity factor of the main solution to be hydrolyzed may vary through a relatively wide range. It will be understood the F. A. of a main solution is substantially higher than the F. A. of the solid seeding compound used. As a rule, the main solution should have F. A. of upwards of say 40%, since solutions made by the usual methods of digesting ore and acid and having acidity factors less than about 40% may be unstable and in most situations contain titanium in colloidal form, and hence are unsuited for use as stock solutions in commercial operations. The general run of crystalloidal titanium sulfate stock solutions formed by digesting titaniferous ores and sulfuric acid, have F. A. in the middle or upper portion of the range of say 50 to 100%. Solutions of this type, when made according to approved plant practice are crystalloidal, have $TiO_2$ concentrations above 100 gpl., and are well suited for purposes of the present process. The invention is also applicable to hydrolysis of main solutions having higher acidity factors, e. g. well above 100%. However, in practice of the invention, it is preferred to use main solutions having F. A. not less than about 55%, i. e. active acid to $TiO_2$ weight ratio of not less than 1.9.

$TiO_2$ concentrations of the main solutions are desirably upwards of 150 gpl. of titanium calculated as $TiO_2$, and it is preferred to employ main solutions of $TiO_2$ concentrations within the range of about 160 to about 210 gpl. Active acid concentrations of main solutions ordinarily range from about 330 to about 370 gpl.

In the case of iron containing liquors, it is preferred to regulate presence of iron so that the final liquors as hydrolyzed do not contain iron in excess of an Fe to $TiO_2$ weight ratio of 0.65. Any undesired excess of iron may be removed from the system by any suitable separation of iron from main solutions, e. g. crystallization of iron as ferrous sulfate.

The appended specific examples of practice of the invention include analyses of typical main solutions, and analysis of representative solid low F. A. seeding compounds.

The feature of principal importance in connection with the seeding compounds is the acidity factor or active acid to $TiO_2$ ratio. It is preferred to use as seeding agents, for overall best results, titanium-oxygen-sulfate compounds of acidity factors not higher than zero, (compounds comprising not more than one equivalent of $H_2SO_4$ to one $TiO_2$ by weight) and not below about minus 20%, (compounds comprising not less than 0.8 equivalent of $H_2SO_4$ to one $TiO_2$ by weight). Ordinarily, it is preferred not to use seed compounds having F. A. of above plus 10% (compounds comprising not more than 1.1 equivalent of $H_2SO_4$ to one $TiO_2$ by weight) nor not lower than minus 30% (compounds comprising not less than 0.7 equivalent of $H_2SO_4$ to one of $TiO_2$ by weight).

The hydrolysis operation may be carried out in usual apparatus comprising a vat equipped with agitators, suitable heating coils and the customary condenser to maintain the desired concentration during hydrolysis. The physical manner in which the solid seeding compound is introduced into the main solution is not of particular importance. Seeding agent may be introduced into the main solution with or without agitating the latter. In most cases the temperature of the main solution at the time of incorporation of the seed compound is not of controlling importance. Ordinarily, however, it is preferred to heat the main solution to boiling and then add the seeding compound.

The quantity of seeding compound used in different embodiments of the invention may vary considerably, depending upon particular circumstances. No particular advantage arises from use of seeding agent in amount exceeding about 13–14%, on a $TiO_2$ weight basis. Good results have been obtained using as little as about 2% seeding agent.

Following are representative examples of application of the invention to hydrolysis of typical crystalloidal high F. A. stock titanium sulfate solutions. In the analyses, $TTiO_2$ represents total titanium concentration calculated as $TiO_2$; $RTiO_2$ represents reduced titanium sulfate (titanous sulfate); $TH_2SO_4$ represents total $H_2SO_4$; $FH_2SO_4$ represents free $H_2SO_4$; $AH_2SO_4$ represents active $H_2SO_4$; and % F. A. represents factor of acidity or acidity factor. Mention of "$TiO_2$ concentration" is intended to mean titanium concentration calculated as $TiO_2$.

*Example 3*

The seeding agent used was made as follows:

1 part of minus 300 mesh ilmenite ore (61.3% total Fe in ferric state) was digested with 2.27 parts 66° Bé. $H_2SO_4$ in an autoclave under 140–150 lbs. pressure for 5 hours. Digest temperature was about 185° C. Digest cake was leached with 1.5 parts $H_2O$ at 70–80° C. to remove water soluble iron sulfate and sulfuric acid, and then washed free of soluble salts. Washed cake was dried at 100° C. Analysis of the seeding agent thus made is shown in column B of following Table I. Analysis of the stock crystalloidal titanium sulfate solution used is stated in column A.

TABLE I

| A | | B | |
|---|---|---|---|
| $TTiO_2$ | 173 gpl. | $TiO_2$ | 38.51% |
| $RTiO_2$ | 3.88 | $Fe_2O_3$ | 7.11 |
| $TFe$ | 105.3 | $SO_3$ | 42.60 |
| $TH_2SO_4$ | 544 | | |
| $FH_2SO_4$ | 147 | | |
| $AH_2SO_4$ | 359 | | |
| Per cent F. A. | 69.3 | Minus | 17.2 |
| Ratio $Fe/TiO_2$ | .609 | | |
| Sp. gr. | 1.587 at 49° C. | | |

For comparative purposes a portion of solution "A" was hydrolyzed but without use of seed. Hydrolyses were carried out in flasks provided with a condenser to maintain constant concentration, an agitator and a thermometer.

Four liters of liquor A were placed in a flask and heated to boiling for a period of 10½ hours without any seeding material being added. 80.6% of the total $TiO_2$ content was precipitated at the end of 10½ hours. Hydrolysis rate is shown to the left in Table II.

1250 cc. of liquor A, at temperature of 55° C. were placed in a flask. 11.3 grams of the seeding agent of column B, Table I, was then added, in finely powdered condition, to the liquor, $TiO_2$ content of the solid compound constituting 2% of the total $TiO_2$ of the charge. The latter was then heated to boiling and held at boiling for 8½ hours at which point 88% of the total $TiO_2$ content of the charge had been precipitated. Hydrolysis rate is shown to the right in Table II. As the seeding agent changes to metatitanic acid, ferric iron is reduced to ferrous sulfate by the reduced $TiO_2$ present in the liquor. For this reason the liquor was periodically tested for the presence of reduced $TiO_2$. At the end of 2 hours the reduced $TiO_2$ in the original liquor was practically all consumed, and 5 cc. of electrolytically reduced $TiO_2$ solution were added. Overall yields of precipitated $TiO_2$ are based on $TiO_2$ in original liquor, seed and reduced $TiO_2$ liquor added.

TABLE II

*Rate of hydrolysis*

| No seed added | | | | 2% seed added | | | |
|---|---|---|---|---|---|---|---|
| Sample | Boiling time | Boiling point | $TiO_2$ precipitated | Sample | Boiling time | Boiling point | $TiO_2$ precipitated |
| | Hours | °C. | Per cent | | Hours | °C. | Per cent |
| 0 | 0 | 110.0 | 0 | 0 | 0 | 109.5 | 0 |
| a | .7 | 110.1 | 4.0 | 1 | 1 | 110.5 | 4.0 |
| a-1 | .9 | 110.3 | 6.9 | 2 | 1.5 | 110.5 | 13.0 |
| 1 | 1.4 | 110.8 | 11.4 | 3 | 2.0 | 111 | 22.5 |
| 2 | 1.9 | 111.2 | 23.0 | 4 | 4.0 | 113 | 63.9 |
| 3 | 2.9 | 112.4 | 35.2 | 5 | 5.5 | 114 | 77.6 |
| 4 | 4.9 | 114.4 | 60.5 | 6 | 6.5 | 114 | 83.9 |
| 5 | 6.9 | 115.3 | 72.1 | 7 | 7.5 | 114.5 | 86.2 |
| 6 | 10.5 | 116.0 | 80.6 | 8 | 8.5 | 115 | 88.0 |

*Example 4*

Iron-free low F. A. solid seeding agent was made as follows. 1 kg. pure calcined $TiO_2$ was mixed with 1.91 kg. 90% $H_2SO_4$ and digested by heating to a solid mass. The digested cake was then baked in a muffle furnace at 283° C. for 3 hours to drive off all so-called free $H_2SO_4$. Final titanyl sulfate, which was a brittle white porous mass, was crushed to minus 100 mesh. Analysis is given in column B of Table III. The liquor hydrolyzed was a stock basic titanium sulfate liquor of analysis shown in column A.

TABLE III

| A | | B | |
|---|---|---|---|
| TTiO$_2$ | 174.8 gpl. | TiO$_2$ | 49.6% |
| RTiO$_2$ | 4.4 | SO$_3$ | 49.48% |
| TFe | 84.6 | | |
| TH$_2$SO$_4$ | 483.5 | | |
| FH$_2$SO$_4$ | 152 | | |
| AH$_2$SO$_4$ | 364 | | |
| % F. A. | 71.8 | | Zero |
| Ratio Fe/TiO$_2$ | .485 | | |
| Sp. Gr. at 33° C. | 1.537 | | |

3220 cc. of liquor were placed in a flask provided with condenser, agitator, and thermometer as in Example 3. When the liquor had been heated to 74° C., 148 grams of solid TiOSO$_4$ of column B were added to the liquor over a 4 minute period. The liquor was then heated to boiling, and hydrolyzed over a 7.1 hour period, at the end of which time 91.9% of the total TiO$_2$ content of the liquor had been hydrolyzed. The TiO$_2$ in the solid TiOSO$_4$ represented 11.55% of the total TiO$_2$ in the charge. The hydrolysis rate was as follows:

TABLE IV

| Sample | Boiling time | TiO$_2$ in gpl. in— | | Precipitated | °C. |
|---|---|---|---|---|---|
| | | Soln. | Ppt. | | |
| | *Hours* | | | | |
| 0-1 | 0 | 174.8 | 0 | 0 | 109.5 |
| 1 | 1.4 | 89.6 | 85.2 | 48.6 | 111.1 |
| 2 | 1.9 | 61.8 | 113 | 64.6 | 112 |
| 3 | 2.9 | 29.2 | 145.6 | 83.2 | 112.8 |
| 4 | 4.9 | 14.4 | 160.4 | 91.9 | 113.2 |
| 5 | 7.1 | 14.4 | 160.4 | 91.9 | 113.2 |

I claim:

1. The method for hydrolytically precipitating titanium oxygen compound which comprises contacting a hydrolyzable titanium sulfate solution—having acidity factor not lower than 40%, total TiO$_2$ concentration of 160–210 gpl., and active acid concentration of 330–370 gpl.,—with a relatively small amount of a solid basic titanium sulfate associated with a relatively small amount of iron sulfate and having acidity factor not higher than 10%, and heating the mass in the presence of a reducing agent to effect hydrolysis thereof.

2. The method for hydrolytically precipitating titanium oxygen compound which comprises contacting a hydrolyzable titanium sulfate solution—having acidity factor not lower than 55% total TiO$_2$ concentration of 160–210 gpl. and active acid concentration of 330–370 gpl.—with a relatively small amount of a solid basic titanium sulfate associated with a relatively small amount of iron sulfate and having acidity factor not higher than zero and not lower than minus 20%, and heating the mass in the presence of a reducing agent to effect hydrolysis thereof.

3. The method for hydrolytically precipitating titanium oxygen compound which comprises contacting a hydrolyzable titanium sulfate solution having acidity factor not lower than 40% with a relatively small amount of a solid basic tatanium sulfate having acidity factor not higher than 10% and not lower than minus 30%, and heating the resulting mass to effect hydrolysis thereof.

4. The method for hydrolytically precipitating titanium oxygen compound which comprises contacting a hydrolyzable titanium sulfate solution having acidity factor not lower than 40% with a relatively small amount of a solid basic titanium sulfate having acidity factor not higher than zero and not lower than minus 20%, and heating the resulting mass to effect hydrolysis thereof.

5. The method for hydrolytically precipitating titanium oxygen compound which comprises contacting an initial hydrolyzable titanium sulfate solution with a relatively small amount of a solid basic titanium sulfate having acidity factor not higher than 10%, and heating the resulting mass to effect hydrolysis thereof.

6. In the method of hydrolytically precipitating titanium oxygen compound from an initial hydrolyzable titanium sulfate solution by heating the same, the improvement which comprises accelerating hydrolysis of said solution by seeding the same with a solid basic titanium sulfate having an acidity factor not higher than zero.

MAXWELL J. BROOKS.